United States Patent Office 3,463,448
Patented Aug. 26, 1969

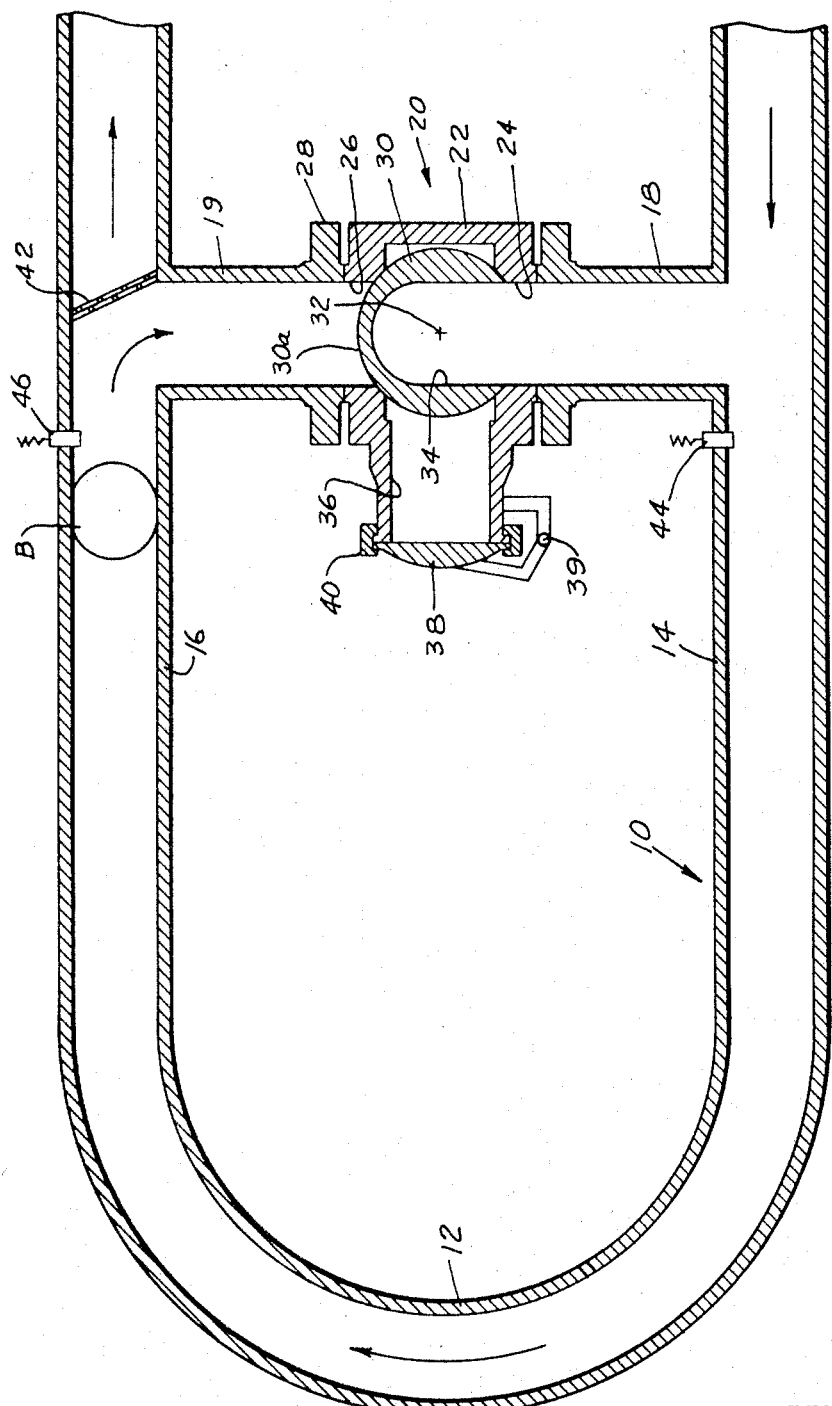

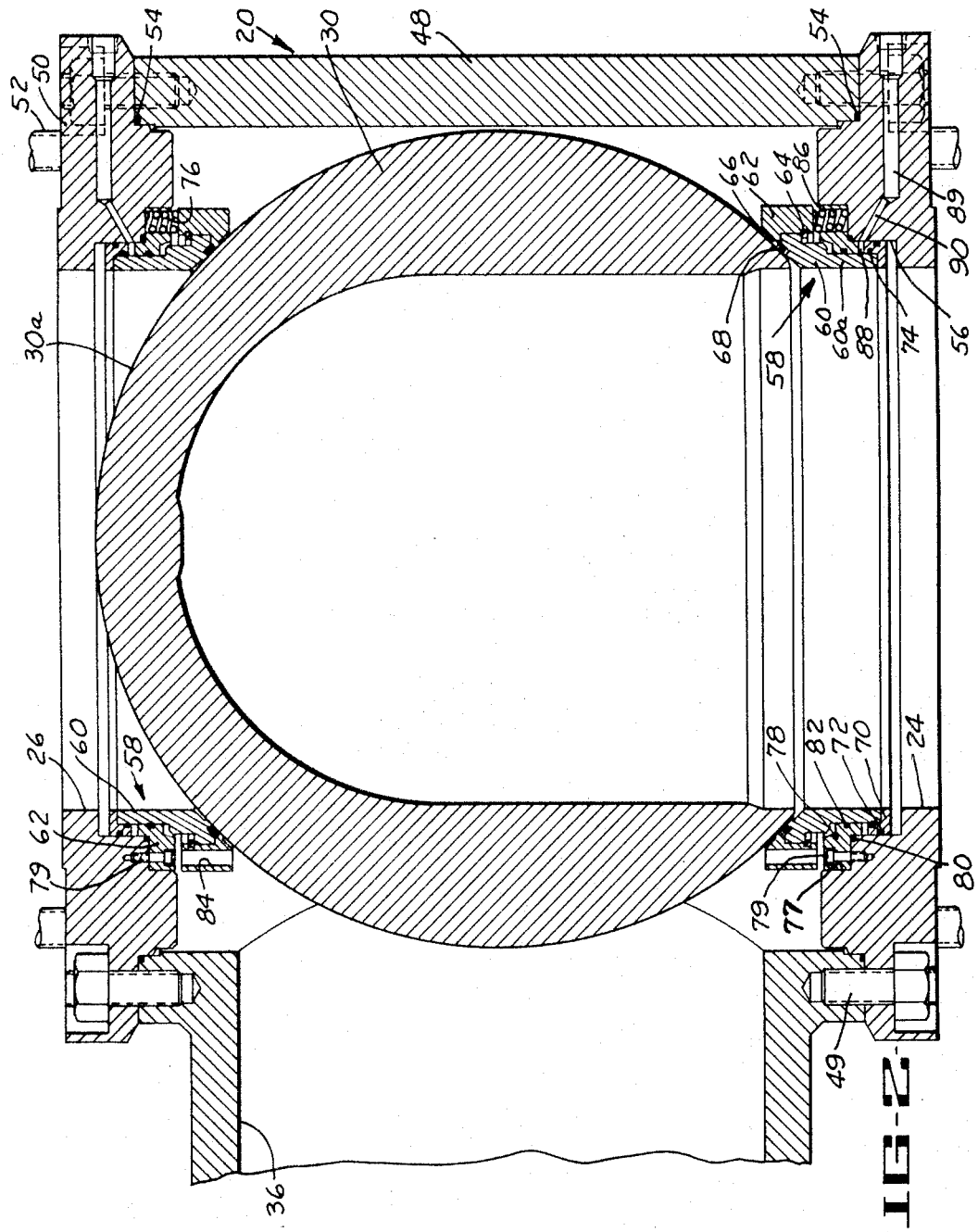

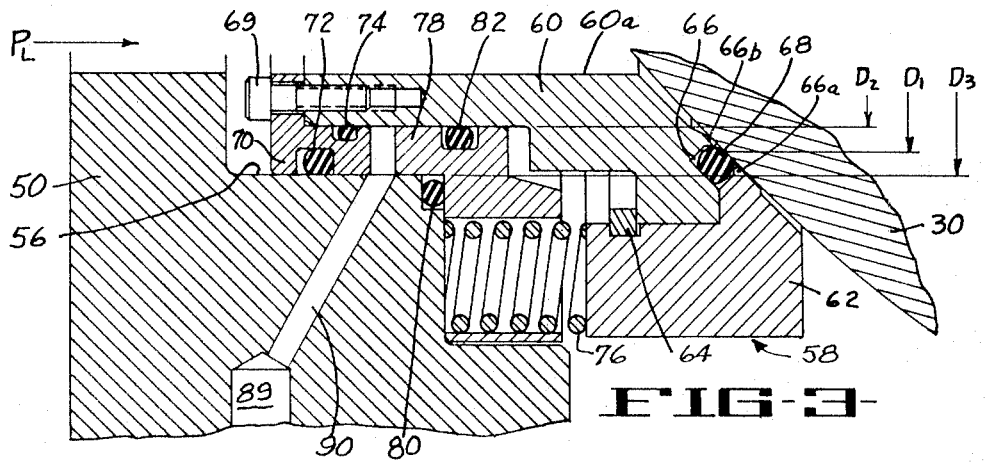
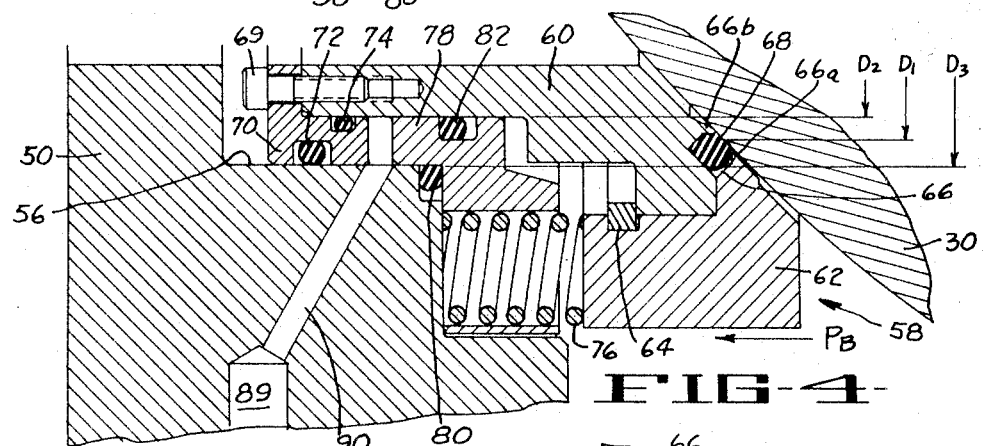
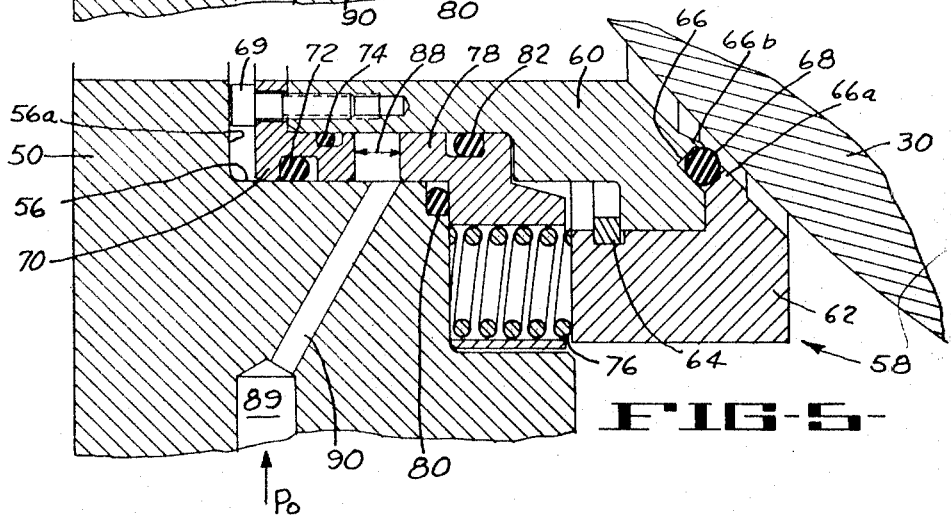

3,463,448
FLOW BLOCKING DEVICE WITH PRESSURE SEAL MEANS
Jack E. Piccardo, Oakland, Calif., assignor to Grove Valve and Regulator Company, Oakland, Calif., a corporation of California
Filed Nov. 24, 1967, Ser. No. 685,495
Int. Cl. F16k 25/00
U.S. Cl. 251—159                                    11 Claims

ABSTRACT OF THE DISCLOSURE

Valves and other flow blocking devices with seat ring seals which may be retracted prior to operation of the movable flow blocking member so that any sediment which may be deposited on the member will not scratch or score the seal means. The seat ring has a forward seal ring, a relatively large tail portion and a relatively small intermediate portion with resilient seals being provided to seal against complementary surfaces on the body. The relatively large trailing portion is displaced rearwardly from the intermediate body portion to form an annular chamber in between them to which pressure fluid may be introduced to retract the seat rings from engagement with the flow blocking member. In the case of an upstream seal, the large trailing portion presents a greater area at the rear than at the front so that a net force urges the seat ring against the flow blocking member. With pressure from the other direction, the fluid again acts against a larger area at the back of the seat ring inasmuch as it intrudes radially inward to the smaller intermediate portion.

Description

This invention relates to a flow blocking device with pressure seal means and, more particularly, a seat ring construction which insures sealing without regard to the direction of pressure, but which may be retracted upon introduction of a pressure fluid from an external source.

In many fluid systems, sediment in the line can accumulate on surfaces of valves and the like and when the device is operated to slide the working surface past seal means, considerable damage to finely finished surfaces and resilient seal can be caused by abrasion.

In many fluid transmission systems, such as pipe lines, means are commonly provided for introducing a rubber spheroid or the like into the pipe line so that it may be carried along by the flowing fluid for the purpose of testing meter accuracy. This may be accomplished by means of a transfer chamber which may take the general form of a ball or plug valve structure except that it cannot be termed a valve in that the bore in the ball or plug extends only partially through it to form a pocket instead of a through flow passage. The housing is provided with a door providing access from the exterior so that the plug may be turned into alignment with the door to permit placement of the spheroid by an operator. Then the ball or plug is rotated to bring it into alignment with one of the pipe passages in order to introduce it into the line. In one type of meter checking system, a section of pipe line is formed into a U-shaped loop with the transfer chamber installed in a line connected across the legs of the loop and a grate or other deflecting means is provided to deflect the spheroid into the return portion of the cross branch. Hence, when the spheroid is introduced into one arm of the cross branch, it is carried through the main pipe line and travels around the loop to the return cross conduit with its travel time being measured in order to determine flow rate. When the spheroid drops into the return branch the pocketed plug is rotated to the position wherein the spheroid will drop into the pocket.

Such systems have proved effective, but some difficulty has been experienced in that dirt and other foreign particles are carried along by the spheroid and then fall by gravity into the return branch line to accumulate on the surface of the ball or plug. Such flow blocking devices are particularly susceptible to scratching and abrasion when the ball or plug is subsequently rotated.

It is, therefore, an object of this invention to provide a flow blocking device which may be used in installations wherein the sealing surfaces are subjected to accumulation of foreign matter, but wherein the sealing surfaces may be moved in face to face engagement without causing damage to the seal.

It is a further object of this invention to provide a valve or other flow blocking device wherein the sealing means may be retracted from sealing engagement during operation.

It is a further object of this invention to provide a flow blocking device which may be operated in the presence of dirt and foreign particles without scratching or abrading seals and polished metal sealing surfaces.

It is a further object of this invention to provide a device with a movable flow blocking member which may be operated with reduced work requirement.

In carrying out this invention, I provide a flow blocking device with seat rings surrounding connecting passages and movable into engagement with the movable closure member. A resilient seal ring is carried on the forward surface of each seat ring and the seat ring is sealed with respect to the body by means of two resilient seal rings, one sealing between complementary large diameter, trailing cylindrical surfaces and the other sealing between small diameter intermediate cylindrical surfaces. A space is provided between these body seals so that pressure fluid may be introduced from an external source to cause the large trailing diameter portion to function as a piston and carry the seat ring back out of engagement with the closure member. Hence, any dirt or foreign matter on the surface of the closure member is simply carried past the seat ring without scratching or abrading it. Even in absence of dirt or grit an advantage is gained in that there is no friction between the disengaged seat rings and the closure member. Hence, there is no wear and operation is much easier. Another advantage in this structure is achieved in that the two seals provided between the seat ring and the body, one larger than the main effective sealing diameter and one smaller than the main effective sealing diameter, result in a net area exposed to pressure in a direction to force the seat ring against the closure member regardless of the direction from which the pressure originates.

Other objects and advantages of this invention will become apparent from the specification following when read in conjunction with the accompanying drawings wherein:

FIG. 1 is a vertical section view in more or less schematic form showing a fluid transmission system including a spheroid transfer device;

FIG. 2 is a section view of a transfer device including features of this invention; and FIGS. 3, 4, and 5 are enlarged partial section views showing seat rings under various conditions of operation.

Referring now more particularly to FIG. 1, there is shown a fluid transmission system including a pipe line 10, a section of which is formed into a loop 12 forming incoming leg 14 and return leg 16 that are connected by the inlet and return branches 18 and 19 of a cross, communicating pipe. Interposed between the inlet and return branch of the communicating pipe is a test article transfer device 20 which is of a ball valve type construction including a body 22 and axially aligned passageways 24 and 26 which are connected into the cross branch line 18, 19, as by securing them between pipe flanges 28.

Within the body 22 is a ball 30 that is rotatable therein about an axis 32 for movement into any of three selected positions to be described. Instead of the usual through passageway of the ball valve, the ball of the article transfer device is bored only partially to form a pocket 34 into which a spheroid or like article may be inserted. The transfer device is also provided with a third passageway 36 which is normally enclosed by a door 38 hinged at 39 to the body 22 and sealed shut by any suitable means such as a split collar member 40. The door provides access to the ball 30 so that a spheroid or pig B may be inserted by an operator. In operation, the ball 30 is rotated so that the pocket 34 is brought into alignment with the access passageway 36 and a spheroid is inserted into the pocket 34 from the exterior. Then, the ball 30 is rotated to the position shown in FIG. 1 and the spheroid B falls by gravity through branch line 18 into the incoming portion 14 of the meter prover loop 12. Thence, it is carried by the flowing stream around the loop to the upper, return leg 16 and, after traversing the loop, is deflected downward by an inclined perforated grating 42 to fall into the return portion 19 of the cross branch conduit. Then, by rotating the ball 30 into the third position, 180° from that shown in FIG. 1, i.e. with the pocket 34 exposed upwardly, it will receive the returning spheroid B. Then, if it is desired to remove the spheroid from the line, the ball 30 is rotated back through 90 degrees to permit removal of the spheroid through the hinged door.

The system just described may be employed effectively for checking meters inasmuch as the flow rate may be determined by the time required for the pig B to traverse the loop. For this purpose, detectors 44 and 46 are installed to be tripped by the pig at the beginning and end of a measured distance around the loop.

In systems of this type, there is a tendency for dirt and other foreign matter to gravitate down the verticle return portion 19 of the cross line and collect on the upper exposed portion 30A of the ball. Such foreign matter is carried along the prover loop 12 of the pipe line by entrainment in the fluid and also by the scrubbing action of the spheroid against the walls of the pipe line. Some of the particles so carried to the verticle connecter line may simply drop into it by gravity while other particles may be deflected downwardly from the grating 42. In any event, without preventive devices such as here contemplated, the particles so accumulated may abrade and scratch the finely polished mating surfaces of the ball 30 and seat rings, or cut resilient seals when the ball is subsequently operated.

Referring now to FIG. 2, there is shown in an enlarged view, the housing 20 including passageways 24 and 26, and a body band 48 which carries the exterior access passage 36 and is secured by cap screws 49 or the like between the body end plates 50 in which the passageways 24 and 26 are formed. The end plates 50 are adapted for connecting the body between pipe flanges 28 (FIG. 1) as by means of protruding studs 52. Suitable sealing means such as O-rings 54 seal between the end plates 50 and the body band 48 to render the body fluid-tight.

Surrounding each of the passageways 24 and 26 and slidably carried in a counterbore 56 in each end plate 50 is a seat ring 58 formed by inner and outer seat ring members 60 and 62 which are secured together as by means of a snap ring 64 and which define between them a recess 66 for the main resilient seal ring such as an O-ring 68. Also secured to the inner seat ring as by means of cap screws 69 (FIGS. 3 to 5) is an enlarged tail piston member 70 which fits slidably in the enlarged counterbore 56. Suitable means such as an O-ring 74 seals between the inner seat ring and the enlarged tail portion 70 and another seal member such as the O-ring 72 seals the enlarged tail portion 70 with respect to the body counterbore 56. Resilient means, such as coil springs 76 are disposed around the body end plates 50 to hold the seat rings 58 against the ball 30.

Secured within an enlarged counterbore 77 in the inner surface of the end plate is a reduction or retainer ring 78 held in place by cap screws 79 with suitable seal means such as O-rings 80 being provided to prevent leakage past the ring. The inner surface of the ring provides a small diameter, cylindrical bearing portion for an intermediate portion 60a of the seat ring and suitable seal means such as O-ring 82 provides a seal between the small diameter body portion and the seat ring. Holes 84 in the outer seat ring member 62 provide access to the reduction ring cap screws 79 and holes 86 in the reduction ring 78 provides seats for the coil spring 76.

In normal sealing position shown in FIG. 2, there is a space 88 between the trailing surface of the reduction ring 78 and the leading surface of the seat ring tail portion 70 providing a fluid chamber into which a fluid pressure may be introduced through ducts 89 and 90 from an external source (not shown).

Referring now to FIGS. 3, 4 and 5, the manner in which the sealing means of this invention operates will be better understood. Sealing is initiated by the springs 76 which urge the seat rings 58 against the ball 30 and in accordance with this invention the spring force is augmented by pressure to which the seat ring is exposed. As there shown, the effective sealing diameter D1 of the main seal ring 68 is larger than the diameter D2 of the intermediate seal 82 between the body reduction ring 78 and the seat ring intermediate portions 60a, but smaller than the diameter D3 of the tail seal. These relative diameters are selected in order to force the seat ring against the ball by fluid pressure regardless of the direction from which the pressure acts. Hence, the seat ring in FIG. 3 is sealing under line pressure $P_L$ acting from the left out to the large diameter D3 to force the O-ring 72 against the right wall of this recess. This same line pressure $P_L$ also acts in front of the seat ring tending to push it rearwardly, but since it acts only out to the smaller main seal diameter D1 there is a differential in area represented by the annular space between the diameters D3 and D1 which produces a net force, i.e.

$$P_L \frac{\pi}{4}(D3^2 - D1^2)$$

to the right causing the seat ring to seal.

In FIG. 4, the pressure $P_B$ is directed from the right, i.e. pressure within the body space between the two seat rings 58 and this fluid pressure is blocked by the intermediate seal 82 sealing on the smaller diameter D2 forcing the seal ring 82 to the left. Again, the body pressure also acts against the front of the seat ring 58 but just down to the effective sealing diameter D1 of the main seal. Hence, the pressure urging the seal ring against the ball is effective inward to the smaller diameter D2 there is a differential area represented by the annular area $$\frac{\pi}{4}(D1^2 - D2^2)$$

between the two sealing diameters which, again acts to force the seat ring against the surface of the ball.

While this explanation of the pressure sealing action referred to a single main effective sealing diameter D1, this was for purpose of simplification and further clarification is required. In an O-ring seal of the type disclosed the higher pressure to which the O-ring is exposed is transmitted through the O-ring and is asserted against the working surface of the member against which it seals. Hence, if the higher pressure is from the lines as in FIG. 3, the main O-ring 68 is distorted outwardly against the wall of the recess and the effective sealing diameter D1 is adjacent the outer lip 66a of the O-ring recess.

Conversely, when the higher pressure is from the outer direction as in FIG. 4 the O-ring 68 will be urged against the inner lip 66b and the effective sealing diameter will shift inward to approximately that point. Hence, the diameters $D_2$ and $D_3$ on which the seals 82 and 72 act may conveniently be based on the diameters of the inner and outer lips 66b and 66a. In this connection, while it is desirable to provide an area differential for pressure sealing as above described, the compression springs 76 will provide a seal even if the areas are equal. In any event the inner seal diameter $D_2$ should be no greater than the effective seal diameter $D_1$, the diameter of inner lip 66b, and the outer seal diameter should be at least as great as the diameter of the outer lip 66a, i.e. the maximum effective sealing diameter D1.

Referring now to FIG. 5, there is illustrated the condition wherein a pressure fluid $P_O$ is introduced from an external source through the ducts 89 and 90 and into the annular space 88 between the enlarged seat ring tail portion 70 and the diameter reducing ring 78 on the body. As shown there, the pressure acts to force the tail portion and the reducing ring apart to retract the seat rings 58 away from the surface of the ball until limited by engagement of the head of the cap screw 69 against the body recess wall 56a. With the seat ring so rectracted, the ball 30 may be operated to rotate it from one position to another and, in the event that dirt or other foreign particles have accumulated on the surface of the ball they will simply pass by the finely finished surfaces of the seat ring 58 and the rubber O-ring 68 without abrading or scratching either. It should be noted that, in the event the hydraulic system fails the springs 76 will return the seat rings to sealing condition which is certainly the more desirable condition in the event of failure.

While the problem of dirt and grit accumulation, and the resultant damage to highly finished surfaces and resilient seals is particularly great in spheroid launchers 20 of the type described, this invention has considerable utility in valve seals. In ball valves, plug valves, gate valves and the like where the closure member is rubbed across the valve seats when opening and closing the valve, considerable wear can result even in absence of grit. This is particularly true in the case of pressure seals such as above described. Moreover, the spring load plus the pressure of the fluid forcing the seat ring against the closure member puts considerable drag on the closure member and greatly increases the resistance to valve operation. In the case of a ball or plug valve a considerable torque load is required to operate the valve.

Having described my invention, I claim:

1. A structure adapted for connection to a fluid conduit, and including a body member having a passageway adapted for communication with said conduit, seal means surrounding said passageway and a closure member having a working surface thereon movable transversely with the axis of said seal means into and out of sealing engagement therewith, said seal means comprising:
   a rigid seat ring axially movable in said body member,
   main seal ring means on the forward end of said seat ring engageable with said working surface,
   trailing and intermediate internal cylindrical surfaces on said body,
   complementary trailing and intermediate external cylindrical surfaces on said seal ring, and
   trailing and intermediate seal rings sealing between said trailing and intermediate complementary cylindrical surfaces, respectively,
   said trailing internal cylindrical surface being of a diameter larger than said intermedate internal cylindrical surface,
   the effectve sealing diameter of said main seal ring against said working surface being at least as great as the diameter of said intermediate seal ring but no greater than that of said trailing seal ring.

2. The combination defined by claim 1 wherein:
   the effective sealing diameter of said main seal ring against said working surface being intermediate that of said trailing and intermediate rings.

3. The combination defined by claim 1 including:
   means for introducing a pressure fluid between said trailing and intermediate seal rings from an external source.

4. The combination defined by claim 1 wherein:
   said intermediate internal surface terminates rearwardly in a fixed, generally radial first shoulder, and
   said trailing external surface terminates forwardly in a generally radial second shoulder displaced from said first shoulder to form a chamber therebetween, and including:
      duct means through said body member in communication with said chamber so that a pressure fluid introduced into said duct means will force said second shoulder away from said first shoulder.

5. The combination defined by claim 1 including:
   an annular member secured to and sealed with the trailing end of said seat ring,
   the outer cylindrical surface of said annular member being finished to form said trailing external surface.

6. The combustion defined by claim 5 including:
   a ring secured in said body member and sealed thereto,
   the inner surface of said ring being finished to a diameter less than that of said trailing internal cylindrical surface to form said intermediate internal cylindrical surface.

7. The combination defined by claim 5 wherein:
   said closure member is of generally spherical configuration and including
   means for rotating said closure member from the exterior of said body member, and
   means forming a cylindrical opening in said closure member adapted to be rotated into and out of alignment with said passageway,
   said working surface being formed by a surface portion of said closure member.

8. The combination defined by claim 1 wherein:
   said body member has a second passageway displaced from said passageway so that said body member is in communication with said conduit at displaced portions of said body member,
   a second one of said seal means surrounds said second passageway to engage another working surface on said closure member, and
   said closure member is movable with said working surfaces slidable across the forward ends of said seat rings.

9. A structure adapted for connection to a fluid conduit and including a body member having a passageway adapted for communication with said conduit, seal means surrounding said passageway, and a closure member having a working surface thereon movable transversely with the axis of said seal means into and out of sealing engagement therewith, said seal means comprising:
   a rigid seat ring axially movable in said body member,
   a main seal ring on the forward end of said seat ring engageable with said working surface,
   a first internal cylindrical surface on said body member,
   a removable retainer ring on said body, the inner cylindrical surface of said ring being of smaller diameter than said first internal cylindrical surface,
complementary first and second external surfaces on said seat ring slidable in said first internal and said inner cylindrical surfaces, respectively,
axially spaced first and second seal rings sealing between complementary cylindrical surfaces on said seat ring and said body, and
means for introducing a pressure fluid between said first and second seal rings from an external source.

10. The combination defined by claim 9 wherein:
said first complementary external cylindrical surface forms a trailing shoulder on said seat ring with a chamber between said trailing shoulder and said retainer ring, said last-named means comprising:
    duct means through said housing in communication with said chamber so that a pressure fluid introduced into said duct means will force said trailing shoulder away from said retainer ring.

11. The combination defined by claim 10 including:
an annular member secured to and sealed with the trailing end of said seat ring,
the outer cylindrical surface of said annular member being finished to form said trailing external surface.

References Cited

UNITED STATES PATENTS

| | | | |
|---|---|---|---|
| 3,148,695 | 9/1964 | Groen Jr. et al. | 251—315 XR |
| 3,283,354 | 11/1966 | Simmons | 137—268 XR |
| 3,288,163 | 11/1966 | Craven | 251—172 XR |

M. CAREY NELSON, Primary Examiner

ROBERT J. MILLER, Assistant Examiner

U.S. Cl. X.R.

137—268; 251—172